US008910773B2

(12) United States Patent
Andersson et al.

(10) Patent No.: US 8,910,773 B2
(45) Date of Patent: Dec. 16, 2014

(54) DEVICE FOR TREATMENT OF BULK MATERIAL, A METHOD AS WELL AS A BEAM CONSTRUCTION INTENDED FOR SAID TREATMENT (71) Applicant: Joseph Vogele AG, Ludwigshafen/Rhein (DE)

(72) Inventors: Conny Andersson, Bollebygd (SE); Allan Carlsson, Hammaro (SE)

(73) Assignee: Joseph Vogele AG, Ludwigshafen/Rhein (DE)

( * ) Notice: Subject to any disclaimer, the term of this patent is extended or adjusted under 35 U.S.C. 154(b) by 0 days.

(21) Appl. No.: 14/050,912

(22) Filed: Oct. 10, 2013

(65) Prior Publication Data
US 2014/0034453 A1 Feb. 6, 2014

Related U.S. Application Data (62) Division of application No. 12/741,898, filed as application No. PCT/SE2008/051273 on Nov. 7, 2008, now Pat. No. 8,646,593.

(30) Foreign Application Priority Data

Nov. 9, 2007 (SE) ...................................... 0702487

(51) Int. Cl.
B65G 29/00 (2006.01)
B65G 65/40 (2006.01)
(Continued)

(52) U.S. Cl.
CPC ................ B65G 47/19 (2013.01); B65G 65/40 (2013.01); E01C 19/48 (2013.01); B60P 1/38 (2013.01); B65G 67/24 (2013.01); B65G 65/46 (2013.01)
USPC ........... 198/611; 198/661; 198/544; 198/545; 198/300; 414/332; 414/526; 414/528

(58) Field of Classification Search
USPC ........... 198/611, 544, 545; 414/332, 526, 528
See application file for complete search history.

(56) References Cited

U.S. PATENT DOCUMENTS 2,626,068 A 1/1953 Bradshaw
3,469,719 A 9/1969 Peterson
(Continued)

FOREIGN PATENT DOCUMENTS

DE 2628325 A1 1/1978
WO WO9700124 A1 1/1997

OTHER PUBLICATIONS

Office Action for corresponding Swedish application issued on Jul. 16, 2010.
(Continued)

Primary Examiner — Joseph Dillon, Jr.
(74) Attorney, Agent, or Firm — Fish & Richardson P.C.

(57) ABSTRACT

The present invention relates to a device for the treatment of bulk material, comprising a platform 24', 24', 28 for supporting bulk material and at least one outfeeding device 28 arranged on the platform for feeding bulk material placed on the platform towards an outlet 29 arranged on the platform, wherein the feeding device has a feeding direction towards the outlet, a first and a second beam 30, 31, 32, 33 is arranged on the platform above the outfeeding device, which beams extends transversal to the feeding direction of the outfeeding device and at least a portion in over of the width of the outfeeding device, wherein the second beam 32 being arranged at a higher level above the outfeeding device than the first beam 31. Further, the invention comprises a method for the treatment of bulk material, wherein the bulk material is placed on a platform 24', 24', 28 comprising an outfeeding device 28 and an outlet 29 arranged in connection to one end of the outfeeding device, and wherein bulk material which is placed on the platform and being fed by the outfeeding device in a direction towards the outlet and is slowed down at several places above the outfeeding device. Additionally, the device comprises a beam construction intended to be used in a device for the treatment of bulk material.

8 Claims, 8 Drawing Sheets (51) Int. Cl.
  *E01C 19/48* (2006.01)
  *B65G 47/19* (2006.01)
  *B60P 1/38* (2006.01)
  *B65G 67/24* (2006.01)
  *B65G 65/46* (2006.01)

(56) References Cited

U.S. PATENT DOCUMENTS

| | | |
|---|---|---|
| 3,724,692 A | 4/1973 | Holland |
| 4,630,988 A | 12/1986 | LaRue |
| 4,881,862 A | 11/1989 | Dick |
| 5,316,429 A | 5/1994 | Connelly et al. |
| 5,553,969 A | 9/1996 | Reed |
| 5,701,726 A | 12/1997 | Smith |
| 5,722,790 A | 3/1998 | Spray |
| 6,805,516 B2 | 10/2004 | Barnat et al. |
| 7,540,700 B2 | 6/2009 | Hook |
| 7,543,765 B1 | 6/2009 | Elling |
| 7,802,956 B2 | 9/2010 | Schertz et al. |
| 8,167,526 B2 | 5/2012 | Schertz et al. |
| 2003/0012601 A1 | 1/2003 | Barnat et al. |
| 2010/0290878 A1 | 11/2010 | Ricketts |
| 2011/0073440 A1 | 3/2011 | Dekoning |
| 2011/0318151 A1 | 12/2011 | Sheehan et al. |
| 2012/0255834 A1 | 10/2012 | Honegger |
| 2012/0269607 A1 | 10/2012 | Farley et al. |
| 2012/0308349 A1 | 12/2012 | Christy et al. |
| 2013/0062164 A1 | 3/2013 | Buschmann et al. |

OTHER PUBLICATIONS

International Search Report and Written Opinion issued in parent PCT application on Feb. 25, 2009.
Search Report which issued Aug. 4, 2014 in corresponding European Application No. EP 08846947.3.

DEVICE FOR TREATMENT OF BULK MATERIAL, A METHOD AS WELL AS A BEAM CONSTRUCTION INTENDED FOR SAID TREATMENT

TECHNICAL FIELD

The present invention relates to a device for the treatment of bulk material, comprising a platform for support of bulk material and at least a belt conveyor arranged on the platform for feeding bulk material placed on the platform towards an outlet arranged on the platform, the belt conveyor having a feeding direction towards the outlet. Further, the invention relates to a method for the treatment of bulk material as well as a beam construction intended for said treatment.

PRIOR ART

Since long time it is known that bulk material with varying fraction sizes, i.e. a variation in size and/or density, results in coarser and/or heavier fractions rolling or falling down the side of the hillocks of bulk material which are gradually formed in connection with loading, transport, dumping and emptying on e.g. a lorry or a train.

A trough is previously known for discharge of asphalt, comprising a bottom and two side walls, a rear wall and a considerably lower front wall as well as a discharge conveyor arranged at the bottom of the trough in the form of an endless belt conveyor with a carrier. The belt conveyor is placed centrally in the trough and feeds the asphalt from the front wall to a discharge opening at the rear wall of the trough and further to a paving device behind the paving machine, where the asphalt is transversally distributed by means of feed screws across the surface to be paved.

At asphalting, one aims at a substantially continuous discharge of asphalt from the trough in order to avoid that joints are formed in the paved surface at stop of the asphalting. Therefore, the trough is designed in such a way that a lorry filled with bulk material may be placed at the front wall and successively dump its load of bulk material over the bottom portion. The accumulations of fractionated bulk material at and along the front and rear walls of the lorry platform are preferably transferred to the discharge trough at start and stop of dumping of the load. This gives an additionally increased concentration of fractionated asphalt at the shifting of lorries, and areas of fractionated asphalt are formed in the joint between the loads of two lorries. De resulting areas with coarse and/or heavier fractions get a greatly impaired quality and life time, which results in early and expensive repairs.

The fractionated areas along the longitudinal walls of the lorry platform will in a corresponding manner land on the discharge trough. At the discharge from the trough said coarse fractions will to a certain extent be carried on by the belt conveyor and form longitudinal strands in the roadway, but some of said coarse fractions will be not be discharged but form a residue on both sides of the belt conveyor.

In order to be able to discharge said residue a discharge trough has been developed with tiltable sides, which at the end of each load forces the asphalt to fall/slide down towards the belt conveyor. However, it has proved that the asphalt being tipped from said areas of the discharge trough, which the belt conveyer does not reach, is substantially fractionated and/or has an undesirable temperature, which results in areas with greatly impaired quality and life time arc formed in the paved surface. This way to empty the discharge trough has therefore been abandoned and the residue appearing on both sides of the belt conveyor may remain and not be shovelled away until the asphalting has been ended for the day.

A method and a device for homogenization of bulk material are known through WO9700124, wherein the bulk material is fed from above into a container which is defined towards the sides and discharged by means of an outfeeding device arranged in the lower region of the container. WO9700124 is characterised in that the bulk material is fed from above in one end of the container, wherein the bulk material is forced to fall down towards the other end of the container, so that a bed of bulk material with a sloping profile is formed in the container, and wherein, because of the fall, heavier and/or coarser fractions of the bulk material fall more than lighter fractions and in that, during each time unit, an amount of bulk material is taken from each section of the length of the container in the feeding direction, which amount corresponds to the supply of bulk material during the same time unit to the straight above lying section of the upper surface of the bed corresponding to said section of the length of the container, whereby the bulk material is forced to move essentially vertically downwards in the bed along the entire length of the bed towards said outfeeding device, which discharges the material from each section in essentially the same rate as new material is supplied to the above lying surface segment of the upper surface of the bed.

DISCLOSURE OF THE INVENTION

An object of the present invention is to eliminate or at least minimise the above mentioned problems, which is achieved by the fact that at least one beam is arranged on the platform above the belt conveyer, which beam extends transversal to the feeding direction the belt conveyer and over at least a portion of the width of the belt conveyor.

Thanks to the invention, the advantage is achieved that the bulk material being discharged from the device gets an essentially better homogeneity. At asphalting a considerably improved paving is obtained, wherein the problems with premature wear because of heavily fractioned asphalt are reduced.

According to an additional aspect of the invention the homogeneity of the bulk material may be improved further by the device comprising at least one first and one second beam, which both are arranged above the belt conveyer and extend transversal to the feeding direction of the belt conveyor over at least a portion of the width of the belt conveyor, and wherein the second beam, in the feeding direction, is arranged closer to the outlet arranged on the platform than the first beam, and wherein the second beam is arranged at a higher level above the belt conveyor than the first beam. By providing the device with more than two beams, which are arranged at an ascending level above the belt conveyor in the feeding direction of the belt conveyor an increased homogeneity of the bulk material is achieved.

Because said beam/beams extends/extend across the entire width of the belt conveyor, a simple and rigid construction is achieved at the same time as the homogeneity of the discharged bulk material is improved further.

According to another aspect of the invention comparatively coarse-fractioned bulk material from an area outside the belt conveyor may be fed towards the belt conveyor and up onto it if the platform comprises at least one co-lateral conveyor arranged in a feeding direction of the co-lateral conveyor which at least partly is directed transverse to the feeding direction of the belt conveyor.

If said at least one co-lateral conveyor comprises a feed screw, the feeding of the bulk material from the side may be controlled comparatively simply.

As the feed screw, in the direction of the belt conveyor, has an open volume between the threads of the feed screw, a discharge of bulk material may be allowed along the entire feed screw and an increased homogenisation is obtained. As the device comprises a plurality of feed screws arranged on each side of the belt conveyor in the feeding direction of the belt conveyor, bulk material may be fed right up to the belt conveyor from essentially the whole bed of bulk material in the device, which also makes it possible to control the discharge from different regions of the bed.

Because the feed screws extend in over the belt conveyor and that feed screws arranged closer to the outlet extend further in over the belt conveyor than the feed screws arranged further away from the outlet, it is possible to achieve an improved homogenisation of the bulk material.

As said at least one beam has a non-circular cross section and is rotatable about its longitudinal axis, the height of the beam above the conveyor belt may be adjusted in a very simple manner.

BRIEF DESCRIPTION OF DRAWINGS

The invention will be described more in detail below with reference to the enclosed drawings, of which.

DETAILED DESCRIPTION OF DRAWINGS

Figure 1:
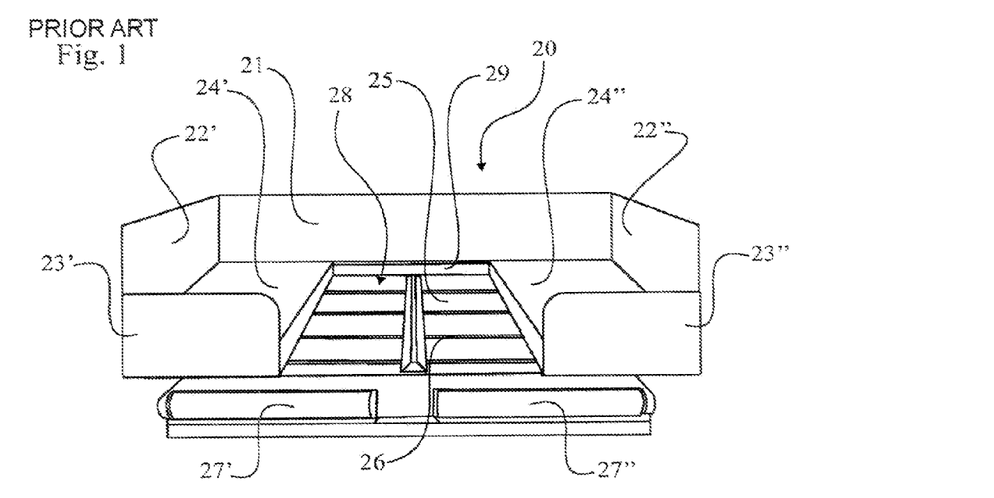
FIG. 1 schematically shows a conventional trough with an outfeeding device in a perspective from the front.

In FIG. 1 a conventional trough 20 with an outfeeding device is shown, comprising a vertical rear wall 21, two vertical side walls 22', 22", a vertical two-part front wall 23', 23", two bottom portions 24', 24", a two-part belt conveyor 28, and two cylinders 27', 27" arranged in the front of the trough itself. The belt conveyor 28 comprises an endless conveyor belt 25 with a number of uniformly distributed carriers 26. The belt conveyor 28 runs out in the rear edge of the trough through an outlet 29 placed in the lower edge of the rear wall 21. The outlet 29 is defined laterally by the bottom portions 24', 24", downwards by the conveyor belt 25, and in the upper edge by the rear wall 21. The size of the outlet 29 controls the volume of the bulk material being transported from the trough.

Figure 2A:
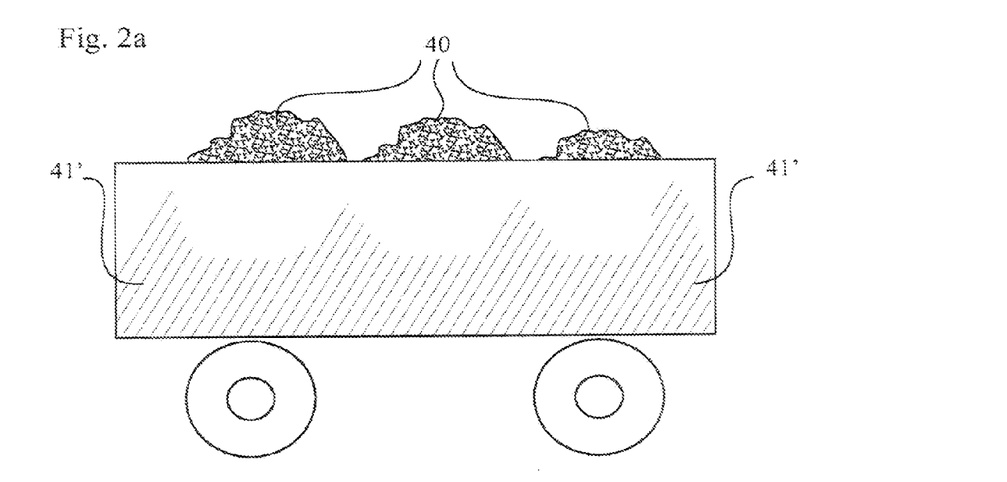
FIG. 2a schematically shows in a side view bulk material loaded on a lorry.
Figure 2B:
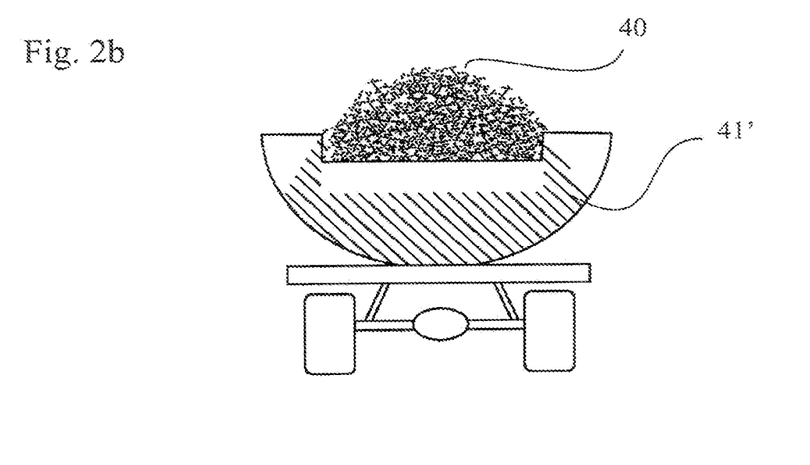
FIG. 2b schematically shows in a view from behind bulk material loaded on a lorry.

In FIGS. 2a and 2b, examples are shown of a lorry platform loaded with bulk material 40 with a characteristic fractionating. Accumulations 41', i.e. regions/volumes with coarser and/or heavier fractions, are formed especially along the front and back walls of the lorry platform and along the side walls. On lorries with long platforms accommodating several hillocks after each other, also fractionated regions appear between the hillocks.

Figure 2C:
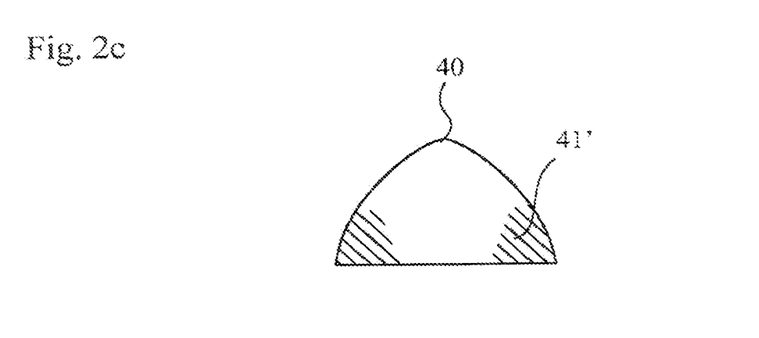
FIG. 2c schematically shows bulk material and its fractionating in a hillock in cross section.
Figure 2D:
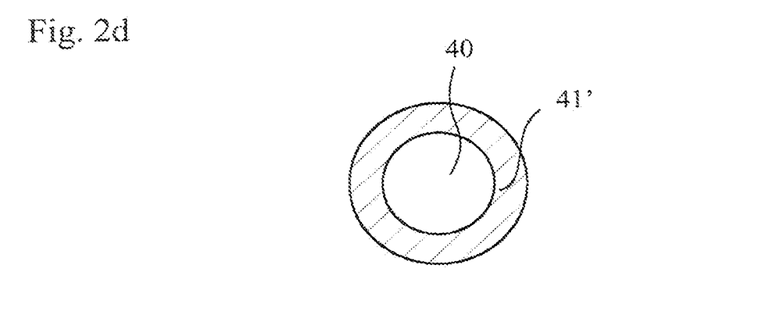
FIG. 2d schematically shows a hillock of bulk material and its fractionating in a view from above.

In FIGS. 2c and 2d, a cross section and a view from above schematically show how the bulk material 40 is distributed in a hillock. Accumulations 41' of coarser and/or heavier fractions are especially formed in the outer and lower regions of the hillock.

Figure 3:
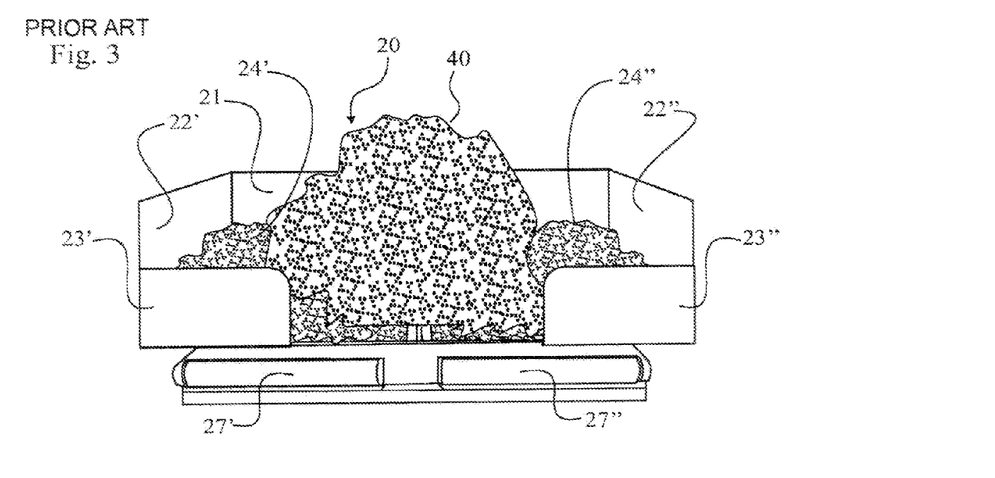
FIG. 3 schematically shows a conventional trough with an outfeeding device with bulk material in a perspective from the front.

In FIG. 3 a conventional trough 20 is shown with an outfeeding device according to FIG. 1 and how a hillock of bulk material has been formed by for instance a lorry filled with bulk material having dumped and emptied the bulk material across the bottom portions 24', 24" and across said belt conveyor 28. In FIG. 3 it is also indicated that the coarsest and/or heaviest fractions of bulk material 40, which on the lorry platform have especially been accumulated along the front wall of the platform and along the longitudinal sides of the platform, see FIGS. 2a, 2b, are transferred to the trough and land in approximately the same manner in the front end of the trough and along its longitudinal sides. Finer fractions from the central regions of the lorry platform fall in the same way substantially centrally in the trough, essentially on top of the belt conveyor 28.

Figure 4:
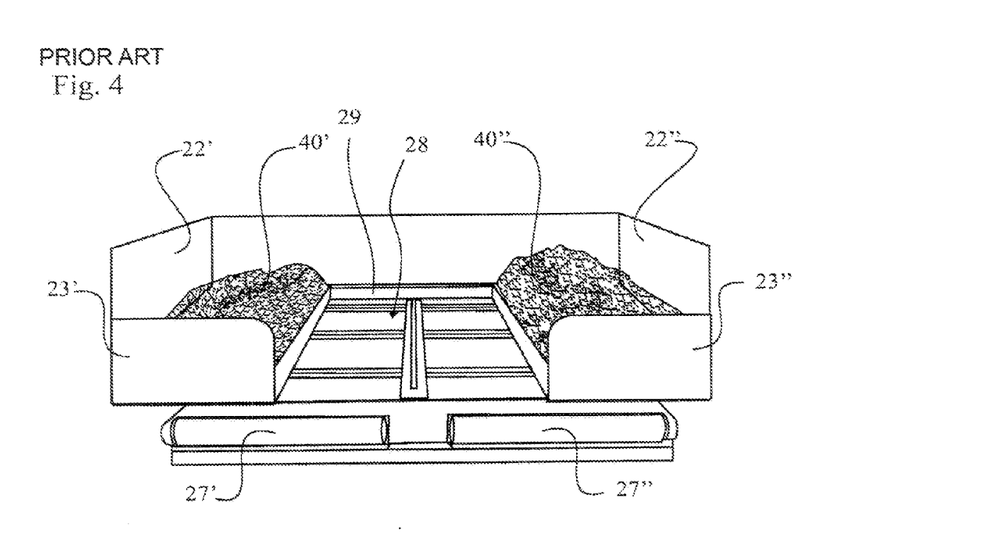
FIG. 4 schematically shows, in a perspective from the front, a conventional trough with an outfeeding device with residues of bulk material.

A paving operation of a certain surface or distance with the length l, the width b by means of a conventional trough 20, where the bulk material consists of e.g. asphalt, will now be described with reference to what is shown in FIGS. 3 and 4. Typically, a substantially continuous paving operation is aimed at. The supply of new asphalt to the trough continues during the whole length which is intended for the paving operation and is performed in such a way that a first lorry A filled with asphalt drives in front of the trough and places its rear wheels just in front of/against the cylinders in the front end 27', 27" of the trough, so that the lorry A will be able to follow the same speed and direction as the paving machine drives. The lorry A successively tips its load into the trough 20 of the paving machine. When the first lorry A has emptied its load of asphalt, it will leave its position and place at the cylinders 27', 27" and is replaced by a second lorry B with a new load of asphalt, whereupon the filling process is repeated. The filling process is repeated until the last portion of the distance with the length l and the width b has been paved and the last lorry has dumped its load of asphalt.

At the dumping from the first lorry A bulk material is accumulated on both sides of the belt conveyor 28 on the bottom portions 24', 24" and along the side walls 22', 22", which bulk material during and after the dumping in progress from the first lorry A will not be transported away during the paving operation, which is shown in FIG. 4. This bulk material essentially consists of coarse fractions which by its own weight cannot fall down against the belt conveyor 28 but form an accumulation of an inclined slope of repose down towards the belt conveyor 28. The accumulations form counter-supports for new bulk material being filled in the trough, which implies that the fall out towards the side walls 22', 22" at the following dumpings will be reduced considerably. The residues 40', 40" of bulk material from the first lorry A, which remain after the completed paving operation, have a non-desired fractionating and/or temperature and will be rejected alternatively returned to the asphalt works.

At the discharge of the bulk material 40 the belt conveyor 28 moves with a direction from the front wall 23', 23" towards the outlet 29 in the rear wall 21. Each empty section on the conveyor belt 25, i.e. the space between two carriers 26, which are inserted at the front wall 23', 23", is filled with bulk material 40, preferably from the front region of the hillock. This results in an essentially larger volume of bulk material being discharged from the front region of said hillock 40, i.e. the region of the hillock 40 adjacent to the front wall 23', 23". The empty space which results in the front region of the hillock of bulk material 40 is refilled by new bulk material rolling and falling to that place, which creates a characteristic emptying process from the trough with the initially mentioned problems in the paved surface as a consequence.

Figure 5:
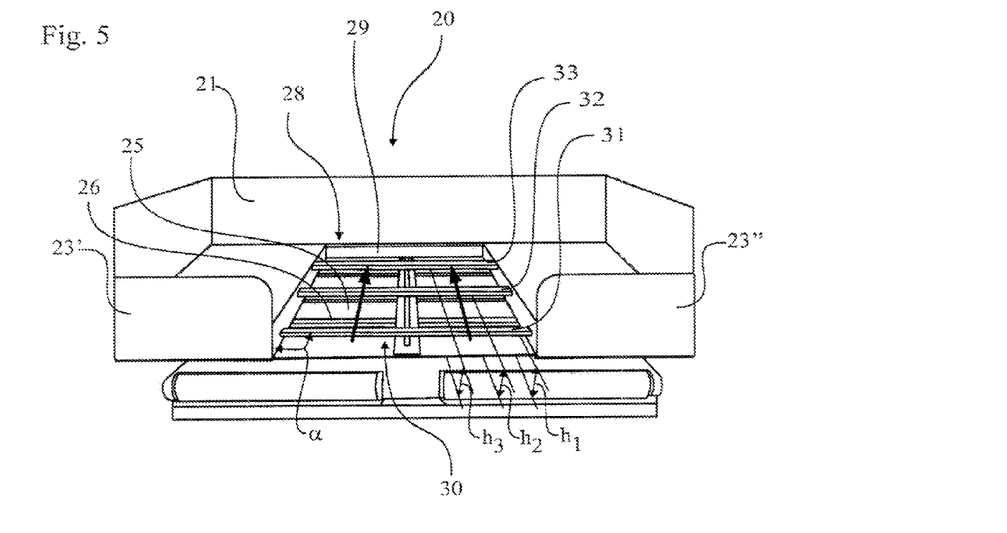
FIG. 5 schematically shows, in a perspective view from the front, a first embodiment of the invention.

In FIG. 5 a first embodiment of the invention is schematically shown in a perspective view. According to this embodiment a conventional trough 20, comprising an outfeeding device in the form of a belt conveyor 28 with a conveyor belt 25 with carriers 26, is provided with a beam construction 30 which is characteristic for the invention. The beam construction 30 comprises at least one first transverse beam 31 placed above the belt conveyor 28 so that part of the bulk material, which is moved in the direction towards the outlet by the belt conveyor, is slowed down at at least one place situated above the belt conveyor. The first transverse beam 31 is placed on a height $h_1$ above the belt conveyor 28 and preferably it is placed in the front half of the trough. The cross-section of the beam may be varied but its shape shall have an essential vertical extension so that it constitutes a transport hindrance for the bulk material. This results in that only a desired volume of bulk material from the front portion of the trough 20 is allowed to follow the belt conveyor 28 and pass below the first transverse beam 31. In other words, the output of bulk material from the front portion of the trough may be adjusted by means of said beam.

Preferably, the first transverse beam 31 is placed at a height $h_1$ above the belt conveyor 28 which is lower than the height of the outlet 29, whereby a certain additional amount of bulk material may be fed on to the belt conveyor from the bulk material in the hillock in a position behind the first beam 31. The height $h_1$ above the belt conveyor on which the first beam 31 is placed may be varied depending on how large an output of bulk material is wanted in this position. Further, one must consider the fraction sizes of the bulk material at the choice of location so that the space below the beam gets a height $h_1$ above the belt conveyor 28, which allows the coarsest fractions of bulk material to pass. According to the embodiment shown, the first transverse beam 31 has a right attachment angle α towards the bottom portion 24' and 24", respectively, i.e. α=90°. Further, the first transverse beam 31 is preferably placed in the front portion of the trough 20 at a distance from the front wall 23', 23" and at such a height that dumping of the bulk material from the lorry is not hindered, i.e. so that the platform may be entirely tilted without striking into the beam. Further, it should be understood that the distance from the front wall 23'. 23" to the first transverse beam 31 is chosen so that bulk material being dumped from the lorry platform may fall down in front of it, at least during the most part of the dumping from the lorry. The beam may be fixedly or movably mounted in the trough in a suitable manner. The simplest way is to attach each end of the beam by means of bolt joints or to weld them to the side walls 22', 22" or along the edges of the bottom portions 24', 24" surrounding the belt conveyor 25. It is also conceivable to arrange the beam so that it will be detachable by mounting at least one holder at a suitable place in the trough in which the beam is inserted. The beam may also be arranged in a rotatable and/or vertically adjustable holder.

According to a first embodiment of the invention, several transverse beams are preferably used in the beam construction 30, in this example three beams 31, 32, 33 placed in succession above the belt conveyor 28. According to this first embodiment, the beams are placed so that the trough is divided into four, essentially equally long transverse sections as seen in the transport direction of the belt conveyor. Further, the beams are placed at a gradually ascending height above the belt conveyor 2. With such an embodiment, the hillock of bulk material will be divided into a number of substantially vertical sections, the length of which, in the transport direction, principally corresponds to the distance between two transverse beams. The width substantially corresponds to the length of the portion of a transverse beam which extends in over the conveyor belt. If the transverse beam runs across the entire width of the conveyor belt, as is shown here, the transversal extension will at least correspond to the width of the conveyor belt. Thanks to the invention, a possibility is offered to adjust the output of bulk material from these different sections of the hillock. New material is taken from the bottom of the respective section in the region behind and/or between respective beam 31, 32, 33, and the output is adjusted by adjusting the height difference, i.e. the height above the conveyor belt, between two successive beams, which determines how much bulk material is allowed to pass below the next beam.

Figure 6:
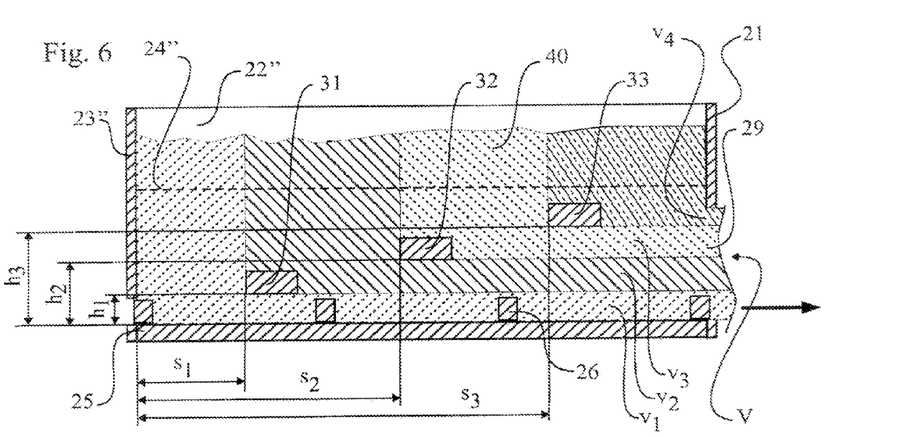
FIG. 6 shows an outline diagram of a first embodiment of the invention in cross section.

FIG. 6 is a sketch for showing the principle of function of the first embodiment of the invention. It should be understood that the sketch does not entirely correspond to real conditions. In the figure a trough 20 is shown which is provided with a belt conveyor 28 comprising a conveyor belt 25 with carriers 26, a beam construction 30, which is characteristic for the invention, with in this case three transverse beams 31, 32, 33.

The first transverse beam 31 is placed in the front portion of the trough 20 at the distance $s_1$ from the front wall 23" and at a first height $h_1$ above the conveyor belt 25. The first height $h_1$ has been chosen so that the coarsest fractions of the bulk material are allowed to pass below it and preferably it has been chosen so that a desired volume $v_1$ of bulk material from the front portion of the trough 20 is permitted to pass.

The second transverse beam 32 is placed in the central portion of the trough 20 at a distance $s_2$ from the front wall 23" and at a second, somewhat higher height $h_2$ above the conveyor belt 25, which permits an addition of bulk material to the conveyor belt 25 corresponding to a desired second volume $v_2$. The second volume $v_2$ falls essentially on top of the first volume $v_1$.

The third transverse beam 33 is placed in the rear portion of the trough 20 at a distance $s_3$ from the front wall 23" and at a third, still somewhat higher height $h_3$ above the conveyor belt 25, which permits a further addition of bulk material to the conveyor belt 25 corresponding to a desired third volume $v_3$. The third volume $v_3$ falls essentially on top of the second volume $v_2$.

Through the outlet 29, which is placed in the lower edge of the back wall 21, bulk material is discharged by the belt conveyor with the volume V, which comprises the sub-volumes $v_1$, $v_2$, $v_3$. Further the height of the outlet 20 is chosen such that a desired volume $v_4$ is taken from the bulk material being close to or in direct connection to the back wall 21 of the trough 20. The fourth volume $v_4$ falls essentially on top of the third volume $v_3$. Thus, the totally discharged volume V of bulk material consists of bulk material having been supplied by the conveyor belt at several positions during the discharge movement of the conveyor belt, i.e. from the respective section as described above. Consequently, the discharged volume V of bulk material may be afforded an essentially improved homogeneity as compared to the use of a conventional discharge trough, where the bulk material has substantially been taken from the front portion of the hillock, as described above with reference to FIG. 3.

Thus, according to the invention, if the beam construction 30 comprises more than one transverse beam the following conditions are valid between the beams:

$h_n < h_{n+1} < h_{n+2}$, where $h_n$ is the height of the first beam above the conveyor belt, $h_{n+1}$ is the height of the second beam above the conveyor belt, etc., and $s_n < s_{n+1} < s_{n+2}$, where $s_n$ is the distance from the front wall 23" to the first beam, $s_{n+1}$ is the distance from the front wall 23" to the second beam, etc.

In order to avoid the problem that essentially coarse fractions of the bulk material form a residue along the side walls 22', 22" of the discharge trough, the trough 20 according to the invention is provided with a co-lateral feeding device 60 comprising at least a couple of transverse feed screws 61', 61". These feed screws 61', 61" are symmetrically arranged on each side of the belt conveyor 28 and attend to the feeding of bulk material from the region beside the belt conveyor. Preferably, the feed screws are made progressive, whereby a supply of bulk material to the feed screw will be possible essentially along the entire length of the feed screw.

Figure 7:
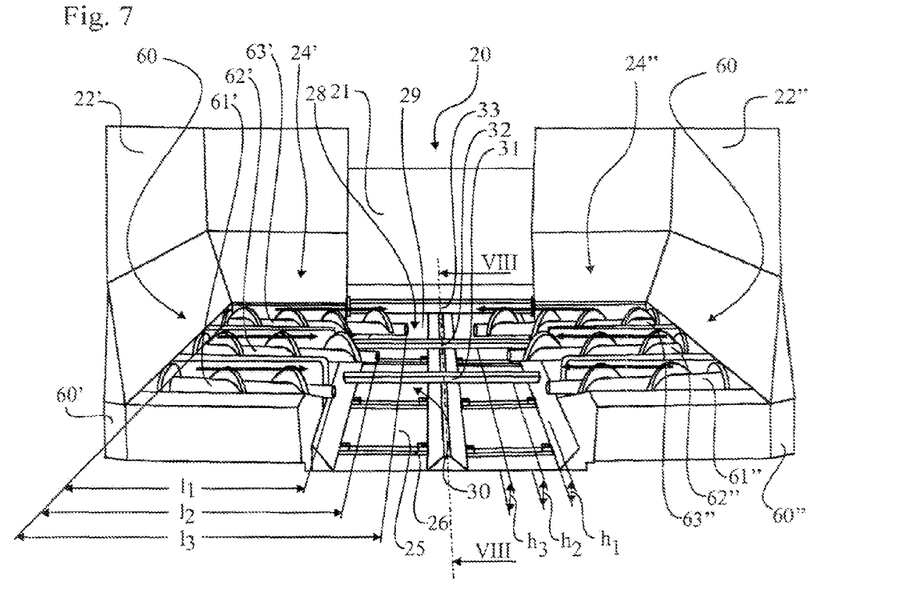
FIG. 7 schematically shows, in a perspective view from the front, a preferred embodiment of the invention.

In FIG. 7 a view of a preferred embodiment of the invention is shown in perspective from the front. In this embodiment the trough 20 comprises, besides the above mentioned beam construction 30 with three transverse beams 31, 32, 33, also three pairs of transverse, substantially parallel, progressive feed screws 61'/61", 62'/62", 63'/63". Said three pairs of progressive feed screws are symmetrically arranged in the screw trough on each side of the belt conveyor 28 adjacent to the bottom portions 24', 24". In the preferred embodiment the three pairs of progressive feed screws have a gradually increasing length $l_1, l_2, l_3$. The respective feed screw is placed so that its discharge end ends adjacent to the edge of or on top of the conveyor belt 25 in a region behind a transverse beam. The respective feed screw is journally mounted in the side wall 22', 22", where it also is connected to a driving device 60', 60".

The first pair of transverse, progressive feed screws 61'/61" is placed essentially in alignment with a symmetry line which is common for said feed screws 61' and 61". Further, they are placed in front of the first transverse beam 31, seen in the transport direction of the conveyor belt, so that the respective discharge end ends in a region in front of the first transverse beam 31. The respective feed screw in the first pair of feed screws 61'/61" has a length $l_1$, which substantially corresponds to the width of the respective bottom portion 24', 24", and its discharge end ends in close connection to the longitudinal side of the conveyor belt 25, just outside the edge of the respective bottom portion 24', 24".

According to the preferred embodiment of the invention, also a second pair of transverse, progressive feed screws 62'/62" are placed substantially parallel with the first pair of feed screws 61'/61" and essentially aligned with a symmetry line which is common for said second pair of feed screws 62'/62". They are placed in front of the second transverse beam 32, seen in the transport direction of the conveyor belt, so that the respective discharge end ends in a region in front of the second transverse beam 32 and behind the first transverse beam 31. The respective feed screw in the second pair of feed screws 62'/62" has a length $l_2$, which in this case is somewhat longer than the length of the first pair of feed screws. Thus, the second pair of feed screws will extend a distance in over the conveyor belt, typically to between about a third to a half of the width of the conveyor belt.

Further, a third pair of transverse, progressive feed screws 63'/63" is in a similar way placed in front of said transverse third beam 33, which pair has a screw length $l_3$, which in this case is somewhat longer than the length of both the first and second pairs of feed screws. Thus, the third pair of feed screws will extend an additional distance in over the conveyor belt, typically to between about a half to three fourths of the width of the conveyor belt.

According to this preferred embodiment one may, as initially mentioned, solve the problem with residues of bulk material being created on the bottom portions 24' and 24", respectively, with the initially described problems in the completed paving as a consequence. Further, it should be understood that coarse fractions, which at the dumping fall along the side walls of the discharge trough, will be continuously fed to the conveyor belt during the paving operation. The coarse fractions fed by the feed screws will also to a certain extent be distributed over the width of the conveyor belt by the respective following transverse beam. In this way, a considerably improved homogeneity of the discharged bulk material during the entire paving operation is obtained.

By adjusting the speed of the driving units 60', 60" and hence also the speed of the feed screws 61'-63", the output of bulk material from different portions of the sides of the feed trough may be varied. Further, it is understood that the device according to the invention according to the preferred embodiment makes a very flexible operation possible, where the homogeneity of the discharged bulk material may be optimised from the current fractionatings in the discharge trough. By arranging the feed screws after each transverse beam, essentially coarse-fractionated bulk material will be fed into each sub-volume, $v_1, v_2, v_3$ of the total volume V of discharged bulk material. As the feed screws extend gradually longer in over the conveyor belt, an uniform homogeneity is also guaranteed over the entire width of the conveyor belt, where the feed screws also have a certain mixing effect both as to width and depth.

Further, an additional advantage is achieved, which is connected to the shift of lorries, where the possibility to vary the output from different regions of the trough enables a quicker emptying of the lorry platform so that more time for shift of lorries may be obtained. By reducing the feeding of bulk material from the region along the side walls and instead allow the main portion of the output to be taken from the central regions of the hillock, i.e. above the conveyor belt 25, the emptying of the lorry is facilitated, which implies that it will be easier to make the bulk material to suffice during the entire time of the shift of lorry. At the same time, a buffer of bulk material is created along the side walls, i.e. in the region on top of the feed screws. When the lorry has driven away, the discharge from the sides may for example be increased so that an essentially homogeneous fractionating is achieved. In this way the problem of spotwise coarse fractions is solved, which fractions appear in connection with the shift of lorries at conventional paving operations of longer paving distances.

Figure 8:
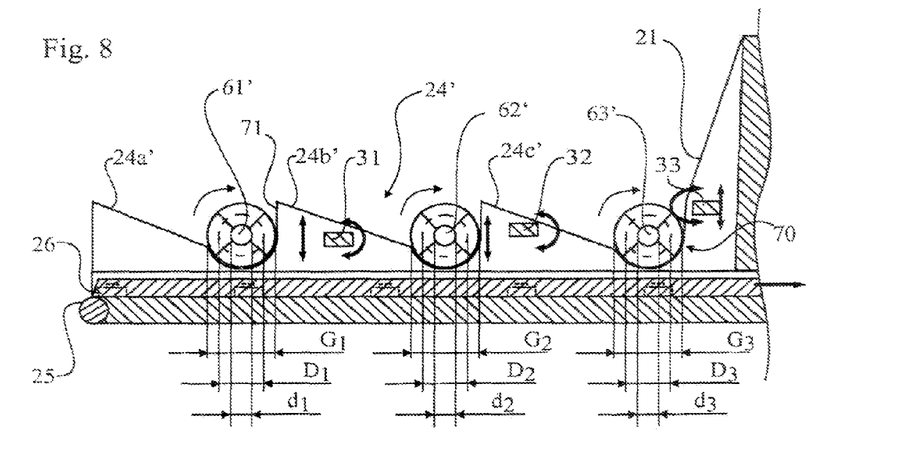
FIG. 8 schematically shows, in a sectional view, a preferred embodiment of the invention.

In FIG. 8 a preferred embodiment of the invention is shown in a longitudinal section along the symmetry line VIII-VIII in FIG. 7. As can be seen from the figure, the feed screws 61', 62' and 63' are placed in a semi-cylindrical discharge channel 70 each arranged in the bottom portion 24'. In front of the respective feed screw the bottom portion has a surface 24a', 24b', and 24*c'*, respectively, which inclines towards the feed screw. The bottom portion 24 rises behind the feed screw as a substantially vertical wall 71. Otherwise, the belt conveyor 60, 25, 26, the transverse beams 31, 32, 33 and the rear wall 21 of the trough are indicated.

The progressive properties of the feed screws 61'-63" are simplest achieved by permitting the core diameter to have a gradually decreasing diameter in the feeding direction at the same time as its outer thread diameter $G_1$, $G_2$, $G_3$, and thread pitch are kept constant. Thus, the starting end of the feed screw, at said side walls 22' and 22", has a larger core diameter $D_1$, $D_2$, $D_3$, and a smaller core diameter $d_1$, $d_2$, $d_3$ in the final end of the feed screw. In this way, the advantage is achieved that the feed screws 61' to 63", which in their feeding direction successively reduces their core diameters and correspondingly increases their thread heights, give a contribution of bulk material essentially along the entire length of the feed screw.

It has proved that the above design contributes to an effective discharge of bulk material, especially if the feed screws are given a direction of rotation which implies that the upper side will move in the same direction as the conveyor belt, i.e. from the front and backwards, which is indicated with arrows in the figures. The movement of the bulk material falling down towards the transverse progressive feed screws 61', 62' and 63' will be facilitated in a direction towards the respective feed screw by influence of the respective sloping plane 24*a'*, 24*b'*, 24*c'*, respectively, in front. Further, the bulk material will be driven backwards in the trough, which corresponds to the movement direction of the belt conveyor and also to the movement of the bulk material being dumped from the lorry platform. This implies that the relative movement between the bulk material and the feed screws decreases, which reduces the wear on the equipment and contributes to reduced energy consumption.

The invention also comprises a beam and a frame comprising at least one beam which are intended to be used in a conventional trough for discharge of bulk material. The beam may be afforded a varied shape, as has been described above. It is transversely placed in a suitable manner above the belt conveyor, so that some of the bulk material, which by the belt conveyor is carried in the direction against the outlet, is slowed down. It is also conceivable to arrange the beam in a frame which is placed on top of the belt conveyor. Especially, if several transverse beams are desired, a frame comprising several beams may be used. Suitably, the frame comprises two opposite side plates/beams, in which at least one transverse beam is arranged in a suitable manner. The frame may easiest be arranged above the belt conveyor by placing it on top of the belt conveyor, so that the side plates/beams will rest against the protection plates which normally cover the driving chains of the belt conveyor. It is also conceivable to arrange the transverse beams at a desired distance from each other and at desired heights along a centrally arranged beam. This centrally arranged beam may for instance be designed such that it is placed on top of the beam constituting protection for the centrally placed driving chains of the belt conveyor. In this way, the beam constructions may be kept in place, especially if one or more of the transverse beams are designed so that they abut the bottom portions of the trough. Normally, the frame with this embodiment should not need to be fixed in the trough as it will be kept in place, partly by the weight which the bulk material exerts, partly by the force which is developed when the belt conveyor forces the masses against the outlet. The frame will then be pressed downwards towards the basis and backwards towards the rear wall of the trough. Preferably, the frame comprises also a transverse beam in the front edge of the frame, which beam may advantageously be designed such that it constitutes the first transverse beam above the conveyor belt. The frame is suitably designed in such a way that the discharge conditions characteristic for the invention may be obtained. In other words, the first transverse beam should be arranged further from the outlet arranged on the platform than the second beam and preferably it should be arranged in the front half of the trough. Preferably, the front beam is also arranged at a lower height above the conveyor belt than the following one/s.

Experiments in Laboratory Scale

Experiment 1

In order to investigate the discharge progress from a conventional trough 20 with a belt conveyor 28, experiments were performed in laboratory scale. A model of a trough 50 was manufactured. The model comprises a front wall 50' with an inlet for the belt conveyor 28 in the lower portion with a width covering the entire bottom of the trough, a rear wall 50" with an outlet for the belt conveyor and two side walls in a transparent material, which are not illustrated in the FIGS. 9*a* to 9*c*. In order to imitate a conventional discharge trough the height of the outlet in the rear wall was made larger than the height of the inlet in the front wall.

Figure 9A:
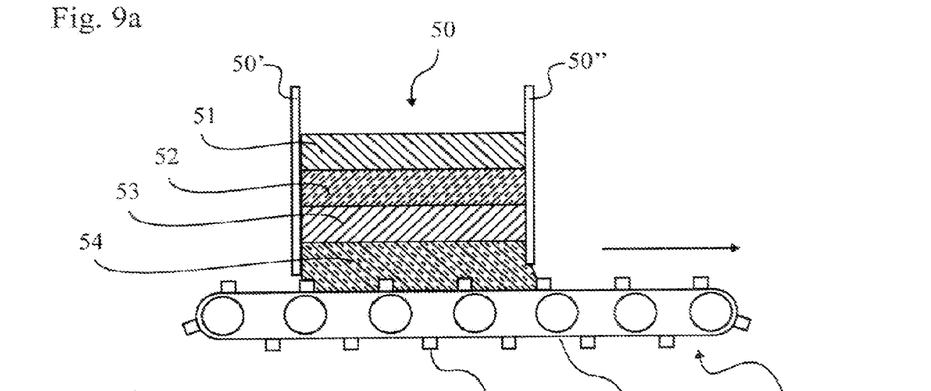
FIGS. 9a-9c schematically show experiments with transport of bulk material out of a conventional trough.
Figure 9B:
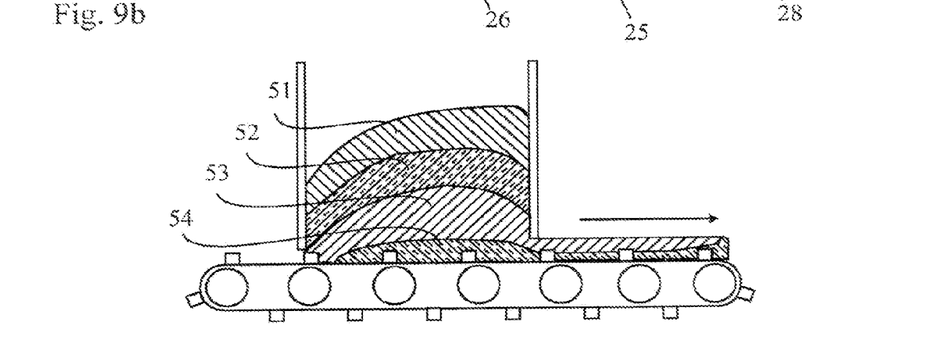
Figure 9C:
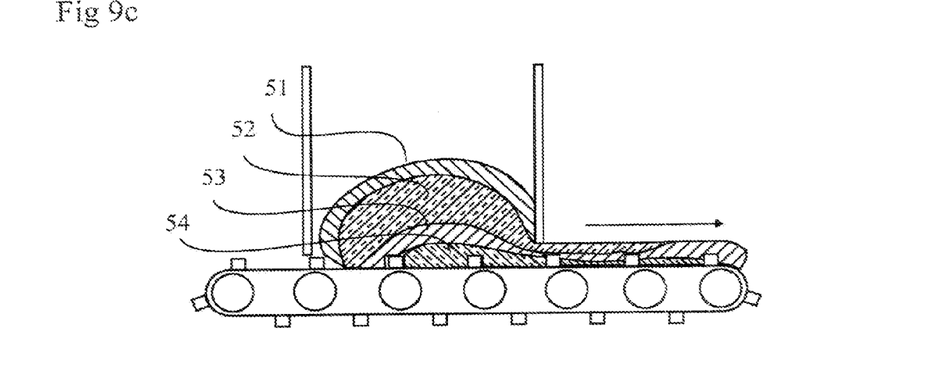

In FIGS. 9*a* to 9*c* a sequence of an output of bulk material in a conventional trough is schematically shown. The bulk material used in the experiment constituted of sand which had been stained to elucidate the flow progress during the discharge. The stained sand was filled into the trough in essentially uniform horizontal layers 51 to 54, where the layers are illustrated with different patterns.

In FIG. 9*a* the trough is shown before the discharge has started and it is illustrated how substantially uniform layers had been arranged in the model, from the uppermost layer 51 to the lowermost layer 54. When the discharge started, the belt conveyor 28 with the conveyor belt 25 and a number of carriers 26 moved in the direction from the front wall 50' to the rear wall 50", whereby an empty compartment, i.e. the region which is the result of the distance between two carriers 26, will enter the trough through the inlet in the front wall 50'.

FIG. 9*b* shows how the layer structure looks when the discharge has been in progress for a while. At the experiment it was established that the major part of the discharged bulk material is filled in this empty compartment, substantially by bulk material falling down along the wall 50', which is shown in FIG. 9*b*. At the experiment, also a certain filling was observed in the section leaving the trough 50 and thus also a certain fall took place along the inside of the wall 50".

Through fall bulk material is continuously refilled against the wall 50', and partly against the wall 50", in the same amount as discharged. On the other hand, it could be established that bulk material which initially laid substantially in the middle of the trough, i.e. at a distance behind the front section of bulk material where a continuous fall occurs and also at a distance in front of the section adjacent to the rear wall of the trough where a certain smaller fall takes place, is not influenced by the belt conveyor on the whole. From this central region no/very little bulk material is discharged and the bulk material maintained essentially its original position.

FIG. 9*c* shows how the layer structure looks when the discharge has been in progress for another while. From the experiment it could be established that concurrently with bulk material being transported away from the front portions of the trough, substantially adjacent to the front wall, i.e. in direct connection to the inlet for the belt conveyor, a fall occurs from the surface of the rear portions of the hillock, while bulk material in the middle of the hillock has essentially kept its layer structure. To an essentially smaller extent an output of bulk material occurs in direct connection to the outlet in the rear wall 50" with corresponding smaller fall as a consequence, which can be seen in the figure.

This results in a very characteristic, to a certain extent rotating movement of the bulk material in the hillock, which very well coincides with the experiences available from the discharge in full scale with conventional troughs of the kind described. It is understood that such a discharge progress implies great problems to obtain an uniform homogeneity of the discharged bulk material, where coarse-fractioned material is substantially placed along the front and rear wall of the trough and finer fractions lie in the central portions of the hillock.

Experiment 2

In order to examine the discharge from a trough 20, which had been provided with a beam construction 30 according to the invention, an experiment was performed in laboratory scale. The model described above was provided with transverse beams 31, 32, 33, which were arranged at a gradually increasing height above the belt conveyor 28 in the transport direction. Like the first experiment, stained sand was filled into the trough in essentially uniform horizontal layers 51 to 54, which is shown in FIG. 10*a*.

Figures 10A, 10B:
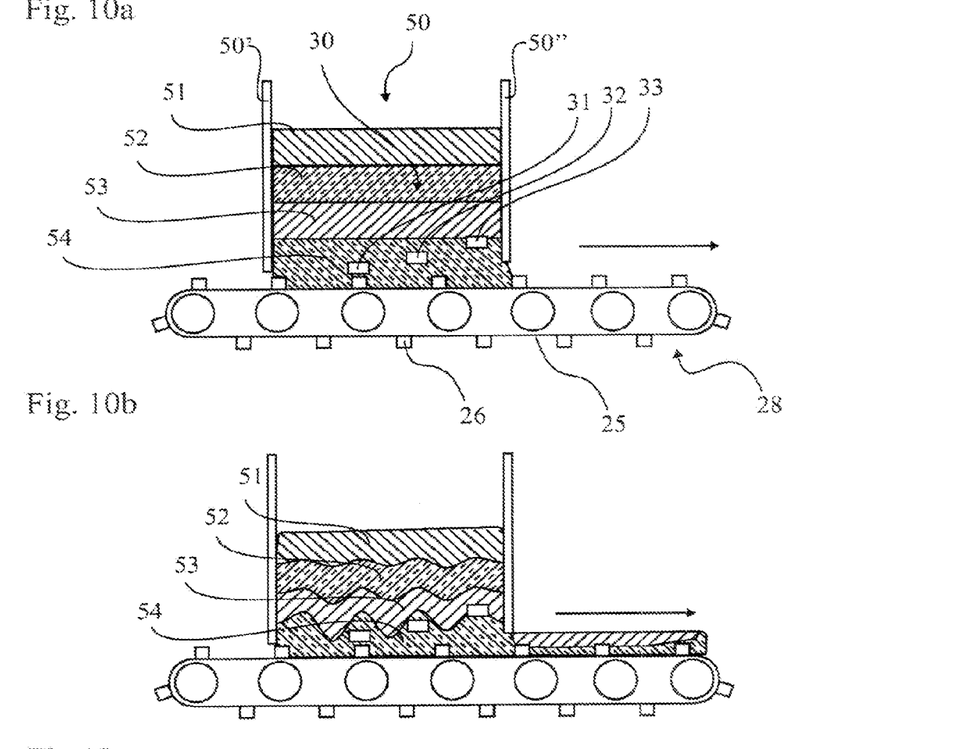
FIGS. 10a-10c schematically show experiments with transport of bulk material out of a trough according to the invention.

FIG. 10*b* shows how the layer structure looks when the discharge has been in progress for a while. As can be seen from the figure, a discharge progress is obtained with quite another characteristic than previously. Thanks to the invention a considerably more uniform discharge of bulk material from the lowermost layer is obtained, which is understood by the fact the upper surface of the hillock is maintained comparatively horizontal and that the different layers sink comparatively uniformly during the discharge. This indicates that in each section of the hillock, i.e. in each region behind and/or between the respective beam 31, 32, 33, a little sub-volume of bulk material is taken out.

Figure 10C:
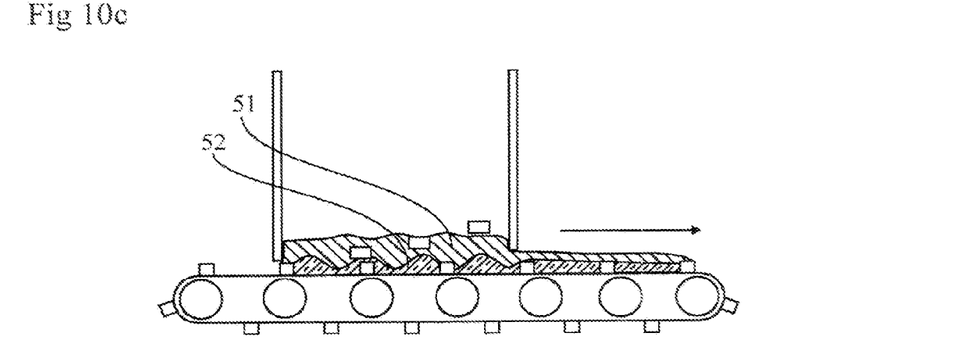

In FIG. 10*c* it is shown how the layer construction looks when the discharge is almost finished. As can be seen from the figure, the layer construction is maintained during the entire discharge, which implies that a uniform output of bulk material from the lower layers of the hillock takes place during the entire discharge. It is understood that with such a discharge progress the bulk material discharged from the trough will contain a contribution from all sections in the trough. Thus, the discharged bulk material will contain a certain amount of coarse-fractioned bulk material from the front and rear sections of the hillock and a certain amount of finer fractions from the more central sections of the hillock. Thus, discharge of a more homogenous bulk material may be offered.

Experiments in Full Scale

The device according to the invention was tested at paving of asphalt on roads and was compared with paving with a reference machine of a conventional type. The device of the invention comprised a conventional trough with a belt conveyor, which had been provided with transverse beams and feed screws according to the most preferred embodiment of the invention as per FIG. 7. The conventional trough was of the kind shown in FIG. 1, i.e. it comprised a belt conveyor but none of the beams and co-lateral feed screws according to the invention. When paving with the conventional trough the coarse-fractioned residue of bulk material which had initially accumulated along the side walls of the trough was given to remain during the entire paving operation as has been described above.

The result from the experiment shows that the homogeneity of the discharged asphalt has been essentially improved. The longitudinal strands of fractionated asphalt which are formed at conventional paving operations have also been minimized, which is apparent from the diagram in FIG. 11.

Figure 11:
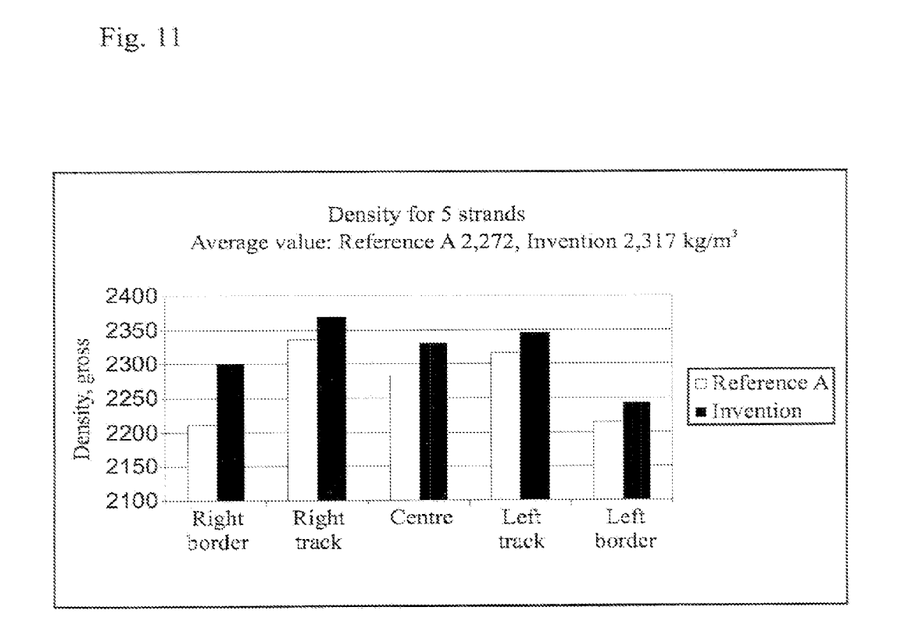
FIG. 11 shows results from experiments in full scale.

In FIG. 11 a diagram shows the average density of the asphalt along a paving distance for the reference machine and for the device according to the invention. The bars of the diagram describe the average values from a number of measurements made at measurements points along the paving distance. The measurement points are at the right border, right wheel track, centre, left wheel track and link border of the road. As can be seen from the diagram the density, i.e. the average value of the homogeneity of the asphalt has increased from 2,272 kg/m$^3$ for the reference machine to 2,317 kg/m$^3$ for the device according to the invention. Further, it can be seen that the difference in average density between the measurement points has decreased, which also indicates an improved homogeneity, which is shown in the table below.

| | Difference in average density [kg/m$^3$] | | |
|---|---|---|---|
| Measurement point | Reference machine | Invention | Improvement [kg/m3] |
| Right border - right track | 125 | 67 | 58 |
| Right track - centre | 56 | 37 | 19 |
| Centre - left track | 33 | 16 | 17 |
| Left track - left border | 100 | 103 | −3 |

At the experiment, an obvious improvement of the density of the road was obtained, which indirectly is a measurement of the homogeneity of the paving. The deviation at the left boarder is explained by the fact that here the paving was made against another paved surface, which resulted in the surface compactor riding on the already paved surface and could thus not compact the asphalt sufficiently. Probably, the left border had shown the same improvement as the right border, if it had been the question of paving against a free edge. The right border shows the greatest improvement, from a density of 2,210 kg/m$^3$ for the conventional device to 2,300 kg/m$^3$ for the device according to the invention, which corresponds to a density increase of 90 kg/m$^3$. The considerably improved homogeneity contributes to the entire width of the paving reaching a more uniform and higher quality. Further, this implies that the life time of the entire paving is lengthened considerably.

A comparison of the size of the so called risk surface occurring at the shifts of lorries was also made. The risk surface was measured by means of a thermo-camera, which gives a measure of the density and hence the quality of the paved surface could be evaluated. The risk surfaces are those surfaces of the paving which are considered to have an impaired quality, which will imply premature wear and need of early repairs. An average value of 12 load shifts with the reference device gave a risk surface of 4.8 m$^2$, while the device according to invention gave an average value for 9 load shifts of 0.6 m$^2$.

Experiments in full scale also showed that it was possible to increase the paving speed, i.e. the paving machine could drive at a higher velocity and still reach a very good quality of the paved surface, i.e. a paved surface with improved homogeneity and high density as compared with the reference machine. At the experiments the paving speed could be increased by as much as 60% and it should be understood that this contributed to an improved production economy.

At repairs of existing worn roads, preferably motorways, sections of the old paving is milled off so that a so called milled box is formed where new asphalt is paved. In the joint between the existing paving and the new paving in the paving direction it has conventionally been difficult to obtain sufficient density and here frost erosion damages often occur because of moisture penetrating into the paving. Thanks to the invention, it has proved that these problems may be reduced and even eliminated, as the discharged asphalt has a considerably improved homogeneity.

ALTERNATIVE EMBODIMENTS

The invention is not limited to the above description but may be varied within the scope of the appending claims. Within the scope of the invention, it should be understood that the number of transverse beams and the number of feed screws may be varied from at least one beam and/or feed screw and upwards, as well as the location of the beams and/or feed screws, i.e. the height above the belt conveyor, attachment angles and relative positions. If the height of the location of the beams above the belt conveyor is varied, it is possible to control the output of bulk material in different sections of the hillock. It is also conceivable that one or several of the objects of the invention may be reached by arranging several beams vertically, to place the beams at essentially the same or gradually decreasing height above the conveyor belt. Further, it may imply an advantage if the beams are not perpendicularly arranged above the conveyor belt but obliquely, possibly alternately inwards and outwards, whereby an advantageous movement of the bulk material in the hillock could be obtained.

It is also conceivable that additional advantages may be reached if the beams are not arranged quite horizontally and if the beams are given a curved shape so that the height of the respective beam above the belt conveyor varies transversely. It is understood that the cross-section of the transverse beams may be varied. For instance, transverse beams with the shape I, U, L may be used or beams with round or oval cross-sections. For instance, by giving the beams a non-circular cross-section and having them rotatably mounted, the height of the respective beam above the conveyor belt may be adjusted comparatively simply.

Further, it is understood that the driving of the feed screws may be varied. In the simplest way, the feed screws are driven by said driving units consisting of a motor and a transmission, e.g. a worm gear, a belt or chain transmission, where the motor and transmission may be connected directly to the respective feed screw. Alternatively, the feed screws are driven by a motor and a transmission, which coupled together drive several feed screws.

Further, the design of the trough may be varied. For instance, the trough need not necessarily be provided with side walls, if the bottom portion is instead made wide and long enough, so that the bulk material being dumped onto the bottom portion cannot fall over the edge. Especially, this embodiment is suitable if the invention is provided with co-lateral feed screws. Further, a plurality of belt conveyors may be arranged side by side, alternatively the width of the conveyor belts may be increased so that the bottom portion of the trough principally constitutes of only one belt conveyor. In such a case, this embodiment requires no co-lateral feed screws. Further, the outfeeding device may be one or several feed screws instead of a belt conveyor. If the feed screw/screws are progressive the need of the beam/beams above them is minimised or even eliminated.

The invention claimed is:

1. A device for the treatment of bulk material comprising:
a platform for supporting bulk material;
at least one outfeeding device arranged on the platform for feeding of bulk material placed on the platform towards an outlet arranged on the platform, wherein the outfeeding device has a feeding direction towards the outlet;
a first and a second beam which both are arranged on the platform above the outfeeding device, wherein said first and second beams extend transversal to the feeding direction of the outfeeding device and over at least a portion of the width of the outfeeding device, the second beam, is closer to the outlet than the first beam in the feeding direction of the outfeeding device, the second beam is arranged at a higher level above the outfeeding device than the first beam,
wherein the two beams are arranged in a frame which is configured to be placed above the outfeeding device and a portion of the frame extends over the outlet in a region located vertically above the outlet.

2. The device according to claim 1, wherein the device contains more than two beams arranged in the frame above the outfeeding device, and the beams, in the feeding direction, are arranged at an ascending level above the outfeeding device.

3. The device according to claim 1, wherein the platform comprises at least one co-lateral conveyor arranged to feed bulk material from a region outside the outfeeding device towards the outfeeding device and onto it in a feeding direction of the co-lateral conveyor being at least partly directed transversal to the feeding direction of the outfeeding device.

4. The device according to claim 3, wherein said at least one co-lateral conveyor comprises a feed screw.

5. The device according to claim 4 wherein the feed screw has an open volume between the threads of the feed screw, which volume increases in a direction towards the outfeeding device.

6. The device according to claim 4, which comprises a plurality of feed screws arranged on each side of the outfeeding device in the feed direction of the outfeeding device.

7. A device for the treatment of bulk material comprising:
a platform for supporting bulk material;
at least one outfeeding device arranged on the platform for feeding of bulk material placed on the platform towards an outlet arranged on the platform, wherein the outfeeding device has a feeding direction towards the outlet;
a first and a second beam which both are arranged on the platform above the outfeeding device, wherein said first and second beams extend transverse to the feeding direction of the outfeeding device and over at least a portion of the width of the outfeeding device, the second beam is closer to the outlet than the first beam in the feeding direction of the outfeeding device, and the second beam is arranged at a higher level above the outfeeding device than the first beam,
wherein the two beams are arranged in a frame which is configured to be placed above the outfeeding device and the at least one beam is rotatable about its longitudinal axis.

8. The device of claim 1 wherein the frame is not affixed to the platform.

* * * * *